May 25, 1954
J. G. ATWOOD
2,679,184
APPARATUS USING MONOCHROMATIC RADIATION
OF DIFFERENT WAVELENGTHS
Filed June 22, 1951
2 Sheets-Sheet 1
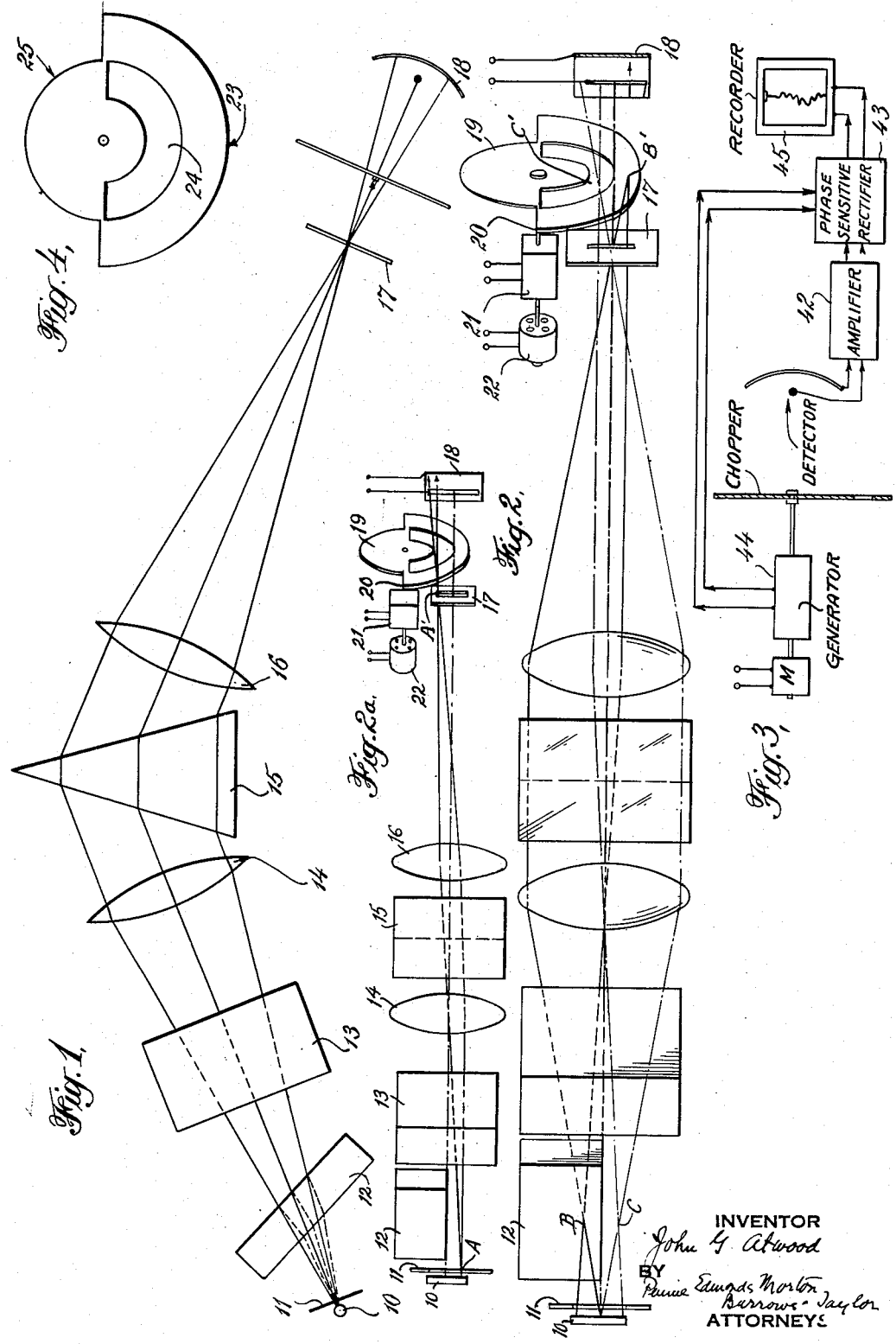
INVENTOR
John G. Atwood
BY
Pennie Edmonds Morton
   Barrows · Taylor
ATTORNEYS

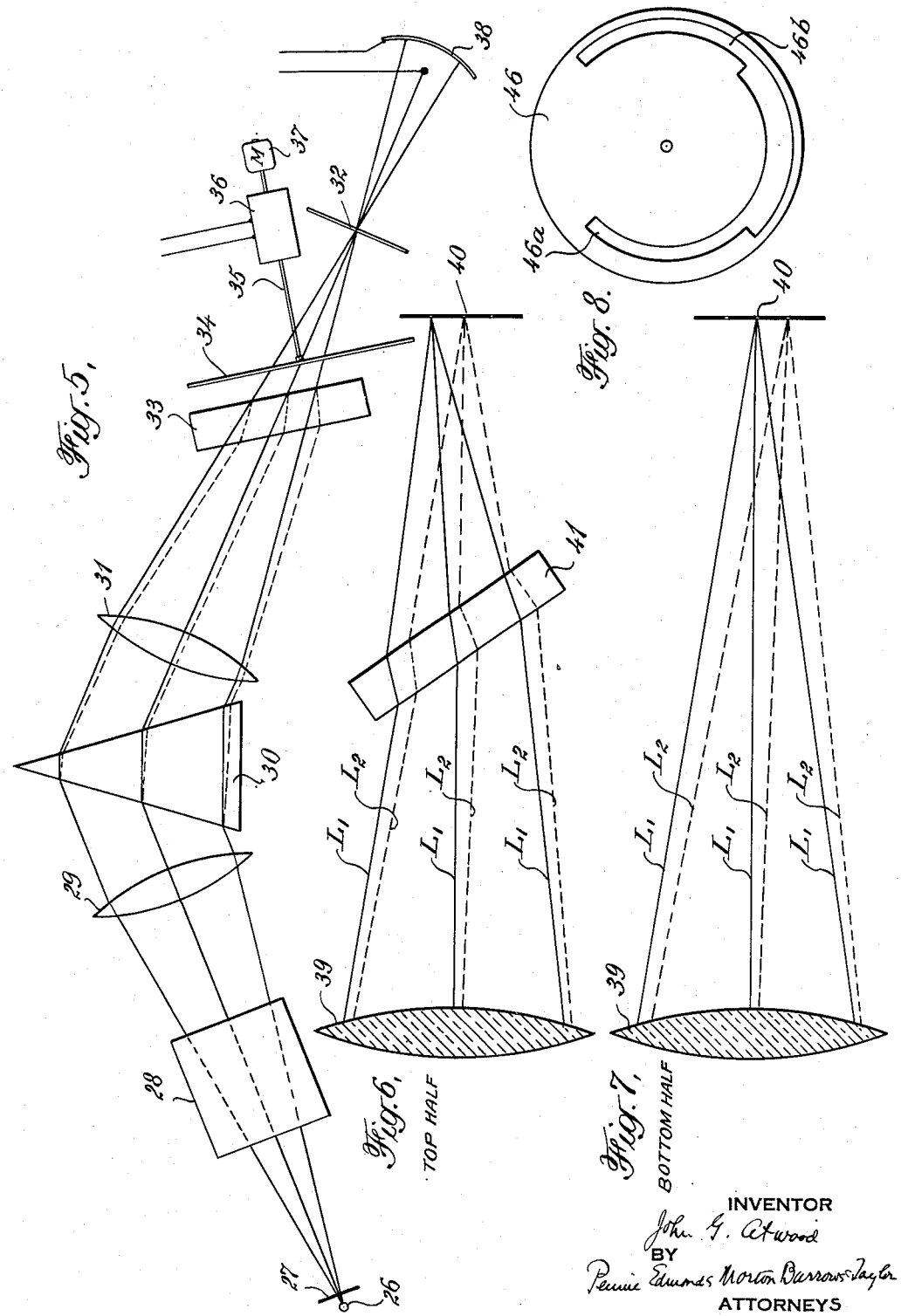

Patented May 25, 1954

2,679,184

UNITED STATES PATENT OFFICE 2,679,184

APPARATUS USING MONOCHROMATIC RADIATION OF DIFFERENT WAVELENGTHS

John G. Atwood, Darien, Conn., assignor to The Perkin-Elmer Corporation, Norwalk, Conn., a corporation of New York Application June 22, 1951, Serial No. 233,073

9 Claims. (Cl. 88—14)

This invention relates to apparatus, in which monochromatic radiation at different wavelengths is employed, and is concerned more particularly with a novel apparatus for segregating from radiation from a source a pair of monochromatic beams differing in wavelength. The apparatus of the invention may be employed for various purposes, of which spectrometry is typical, and may be utilized to especial advantage in spectral analysis for the quantitative determination of the composition of a two-component mixture by ascertaining the difference between or the ratio of its absorptions of energy at different selected wavelengths. Accordingly, an embodiment of the invention suitable for use as an absorption spectrometer will be illustrated and described in detail for purposes of explanation and the application of the invention to other fields will then be apparent.

In a conventional spectrometer, divergent radiation from a source enters the system through an entrance slit, usually passing through the sample in front of or just behind the slit. The beam is then collimated, dispersed by a prism, and focused upon an exit slit, through which radiation of the desired wavelength issues to fall upon a detector, such as a photocell, thermocouple, etc., responding to the radiation reaching it. Such an instrument may be modified by addition of an entrance slit, an exit slit, and a detector to permit its use in analysis of a sample by means of radiation of two different wavelengths but the use of the modified instrument for such analysis is unsatisfactory for a number of reasons. It is difficult to adjust the instrument, so that radiation of the desired wavelengths falls upon the respective detectors and, in addition, errors in analysis are likely to arise because of differences in response of the detectors, resulting from variations in their sensitivity ascribable to uneven aging, etc.

The present invention is, accordingly, directed to a novel apparatus, by means of which a pair of monochromatic beams differing in wavelength may be derived from divergent radiation of many wavelengths emitted by a source, and the use of the new apparatus in a spectrometer overcomes the difficulties encountered in carrying out a spectral analysis involving radiation of two wavelengths by means of a conventional spectrometer modified as described above. In a spectrometer embodying the invention, only a single detector is required, so that the use of the spectrometer is relatively easy and variations in detector performance are avoided.

The apparatus of the invention includes a monochromator receiving radiation from a source and provided with collimating, dispersing, and focusing means. In addition, the apparatus is provided with means within the monochromator for deviating part of the radiation from its normal optical path, so that the deviated and undeviated radiation falling upon the exit slit is made up of two kinds of monochromatic radiation differing in wavelength. The apparatus is provided with chopping means, which operate to cause the deviated and undeviated parts of the beam to be interrupted in alternation, and thus permits the use of a single detector responding to the radiation of the two wavelengths.

For a better understanding of the invention, reference may be made to the accompanying drawings, in which:

Fig. 1 is a diagrammatic plan view of one form of instrument embodying the invention;

Fig. 2 is a diagrammatic view of the instrument of Fig. 1 in side elevation and showing the chopping means disposed at an image of the deviating element;

Fig. 2a is a view similar to Fig. 2 and showing how a point on the source is imaged at the exit slit;

Fig. 3 is a diagrammatic view of one form of apparatus for utilizing the output of the detector;

Fig. 4 is a view in front elevation of one form of chopping disc, which may be used in the instrument;

Fig. 5 is a plan view of a modified form of the apparatus;

Figs. 6 and 7 are diagrammatic plan views showing the action of the refracting means; and Fig. 8 is a view in front elevation of an alternative form of the chopping disc.

The new apparatus may be employed in different forms involving the use of radiation of different kinds, and the forms of the apparatus shown in the drawings are for use in spectral analysis by means of visible radiation. When the instrument is to be used in analysis by means of other radiation, the source is changed and other alterations made in the instrument, as will be explained.

The apparatus shown in Fig. 1 includes a source 10, such as an incandescent lamp, emitting divergent visible radiation including the two wavelengths to be used for analytical purposes and a single uninterrupted entrance slit 11 of the usual construction is mounted adjacent the source, so that a narrow band of radiation from the source will enter the system through the slit. The lower half of the beam travels along the normal optical path indicated, while the upper half of the beam is refracted by an element 12. The refracting element is a plane parallel plate of a material transparent to the radiation and it is mounted for angular adjustment about a central vertical axis. Beyond the element, the refracted and unrefracted portions of the beam pass through a chamber or cell 13 containing a sample to be analyzed and having front and rear walls transparent to the radiation. Beyond the sample cell, the radiation passes to a collimating lens 14, which parallelizes the rays.

The collimated beam passes from the lens 14 to means for dispersing the beam and, in the instrument illustrated, the dispersing means take the form of a prism 15 mounted for adjustment on a vertical axis. The dispersed beam leaving the prism passes through a collecting lens 16, which focuses the beam upon an exit slit 17, and the narrow beam of radiation leaving through slit 17 falls upon a detector 18 generating a voltage in response to radiation and illustrated as a photocell.

Between the exit slit and the detector, the beam is chopped by means of a rotary disc 19 mounted on the shaft 20 of a generator 21 driven by a motor 22. The disc is of the form shown in Fig. 4, and it includes a section 23, which is approximately semi-circular in form and has a solid curved rim and a semi-circular slot 24 inward from the curved rim. The remainder of the disc is made up of a section 25, which is approximately semi-circular and has a radius equal to the outer radius of slot 24. The shaft 20 is horizontal and is so disposed that the refracted upper half of the beam is alternately free to pass through slot 24 of the disc and intercepted by section 25, while the unrefracted lower half of the beam is alternately free to pass by the rim of section 25 and intercepted by the rim of section 23.

In the modified form of the new instrument shown in Fig. 5, the radiation from the source 26 passes through entrance slit 27 and sample cell 28 to the collimating lens 29. The collimated beam is then dispersed by prism 30 and the dispersed beam is focused by lens 31 upon an exit slit 32. Between the focusing lens and the exit slit, a refracting element 33, in the form of a plane parallel plate, lies in the path of the upper half of the beam, and, between the refracting element and the exit slit, the radiation is chopped by a disc 34 similar to disc 19 and mounted on the shaft 35 of a generator 36 driven by a motor 37. The disc 34 lies with its plane of rotation parallel to one face of the plane parallel plate 33. The radiation passing through the exit slit falls upon a detector 38, which may be a photocell.

The manner in which the refracting element functions, will be understood from an examination of Figs. 6 and 7, in which a lens 39 is shown as focusing radiation upon an exit slit 40. Fig. 6 represents the upper half of a beam, into which a refracting element 41, in the form of a plane parallel plate, has been lowered, while Fig. 7 shows the lower half of the beam. In the figures, the solid lines $L_1$ and the dotted lines $L_2$ represent the paths of rays of two different wavelengths $\lambda_1$ and $\lambda_2$, respectively. It will be apparent from Fig. 7 that, in the lower half of the beam, the lens 39 has focused the rays $L_1$ upon the exit slit 40, whereas, as shown in Fig. 6, the refracting element 41 has caused the rays to be shifted so that the rays $L_2$ fall upon the exit slit. Accordingly, the lower half of the beam, which passes the exit slit, is made up of radiation of the wavelength $\lambda_1$, while the upper half of the beam is made up of radiation of the wavelength $\lambda_2$. The same result is obtained, regardless of whether the refracting element is placed in the path of the dispersed radiation being focused upon the exit slit, as in the instrument illustrated in Fig. 5, or lies in the path of radiation, which has just entered the system through the entrance slit, as shown in Fig. 1.

The use of the chopping means, including a rotary disc of the form shown at 19, causes the detector to receive radiation of the two wavelengths in alternation. The signals produced by the detector vary in amplitude, depending upon the transmission by the sample of the radiation of the two wavelengths, and the signals may be amplified in amplifier 42 and fed to a phase sensitive rectifier 43, which also receives the output of the synchronous generator 44 driven at the same rate as the chopping disc. The output of the rectifier may then be the difference between the two signals, and this output may be fed to a suitable recorder 45.

If desired, the radiation may be chopped by means of a disc 46, which has an arcuate slot 46a passing the refracted portion of the beam and a similar slot 46b passing the unrefracted portion of the beam. Each slot is 180° in length, and the slots overlap by 90°. By the use of suitable breakers and filters, the output of the detector receiving the radiation chopped by disc 46 may be converted into signals, whose amplitude is proportional to the amount of radiation of the two different wavelengths transmitted by the sample being examined.

In the new instruments for use in the visible field, the collimating and focusing elements are front surface mirrors or glass lenses and the refracting element is glass. In a new instrument for use in the ultra-violet field, the collimating and focusing elements are front surface mirrors or quartz lenses and the refracting element is quartz. In an instrument for use with infrared radiation, the collimation and focusing are accomplished by mirrors and the refracting element may be a crystal of NaCl, KBr, etc. Also, the source of infrared radiation is of any of the usual kinds, as, for example, that known commercially as a "globar." The dispersion of the collimated beam is shown as being effected by means of a prism, but diffraction gratings or interference filters may be substituted therefor, if desired. The detector used will depend on the kind of radiation employed and, in the infrared field, may be a thermocouple, etc.

In the instrument shown in Fig. 1, the refracting element is placed between the entrance slit and the collimating lens. Radiation of one wavelength $\lambda_1$ is focused upon the exit slit by adjustment of that slit, by rotation of the dispersing element in the usual way, or by adjustment of the entrance slit, and, thereafter, radiation of the second wavelength $\lambda_2$ may be focused upon the exit slit by angular adjustment of the refracting element. Depending on the position of the refracting element, the wavelength $\lambda_2$ may be less than, equal to, or greater than the wavelength $\lambda_1$.

In the instrument, the optical system is reversible, and the source and detector may thus be interchanged. If the sample is of good optical quality, the position of the sample cell is not critical and it may be placed anywhere in the system but is preferably placed in front of the entrance slit, beyond the exit slit, between the entrance slit and the collimating lens, or between the focusing lens and the exit slit. If the sample is of bad optical quality, the sample cell must be placed between the source and the entrance slit or between the exit slit and the detector. Instead of using a separate sample cell, the entire casing of the instrument may be used as the cell, when the sample is gaseous and does not adversely affect the components of the instrument. The position of the deviating element in the form of a plane-parallel plate is critical only to the extent that it must lie between the entrance slit or equivalent and the collimating element or between the focusing lens and the exit slit or equivalent, that is, the deviating element must not be in the space between the collimating and focusing elements.

It will be clear from Fig. 2a that every point on the source is imaged at a corresponding point in the plane of the exit slit 17, as, for example, point A on the source has an image at point A' at the exit slit. Similarly, as shown in Fig. 2, every point in a plane, which lies adjacent to the entrance slit and transverse to the beam entering that slit, has an image in a corresponding plane beyond the exit slit. Thus, points B and C lying in such a plane, which passes through the deviating element, have respective images at B' and C' in a plane beyond the exit slit. By properly forming the chopping disc 19 and placing it at the plane containing the points B', C', that is, at an image of the deviating element, it is possible on rotation of the disc to cause deviated and undeviated radiation to fall alternately upon the detector.

At the plane of disc 19 in the system shown in Fig. 2, the deviated and undeviated rays are separate and the disc may thus chop them at a phase difference. In the system shown in Fig. 5, the disc 34 lies close to the deviating element 33 and again it is at a locaton, where the deviated and undeviated rays are separate, so that the disc may chop them at a phase difference. If discs 19 and 34 were omitted from the systems of Figs. 2 and 5, respectively, a mixture of the two kinds of radiation would fall upon the exit slit and likewise upon the detector in each system. For convenience, the position of the chopping disc, in which it is capable of acting to interrupt the deviated and undeviated portions of the radiation periodically, may be termed the "effective position" of the disc in relation to the deviating means.

The chopping disc 46 is used in the same manner as discs 19 and 34, and differs from those discs in one respect only. Discs 19 and 34 chop the two parts of the beam in alternation and with a phase difference of 180°, so that each part of the beam is chopped in a cycle with an on period of 180° and an off period of the same length. The disc 46 chops the two parts of the beam 90° out of phase with each part of the beam being chopped in a cycle having an off period and an on period of equal length. As a result, the radiation falling upon the detector during a single rotation of disc 46 is made up first of one kind of radiation only, then of both kinds, and then of the second kind only, after which all radiation is cut off.

In those instruments, in which an entrance slit as wide as 1 mm. can be used, the source may be placed at the focus of the collimating element and the slit dispensed with. Also, by using a detector having a target of proper width and positioning the detector at the proper location, the exit slit may be dispensed with. Positioning the source at the collimator focus is thus for some purposes the equivalent of employing a source plus an entrance slit. Similarly, the use of a detector having the proper location and a target of the proper width is the equivalent of a detector plus an exit slit.

In the use of a spectrometer provided with the new apparatus in the spectral analysis of a sample by means of radiation of two wavelengths $\lambda_1$ and $\lambda_2$, a sample of the material is introduced into the sample cell and the source is turned on. The entrance slit, the exit slit, or the dispersing element is then adjusted, until radiation of one of the wavelengths is focused upon the exit slit and falls upon the detector. The refracting element is next angularly adjusted, until radiation of the other of the two wavelengths is focused upon the exit slit and falls upon the detector. As the radiation passing to the detector is chopped, the output of the detector is broken up in time into two signals, which are out of phase with each other, and, by appropriate known means, the signals may be utilized to show the difference in absorption by the sample of radiation of the two wavelengths. If a second analysis is to be made by means of radiation of different wavelengths, neither of which has been used before, the entrance slit, the exit slit, or the dispersing element is adjusted to focus radiation of one of the new wavelengths upon the exit slit, and, thereafter, the radiation of the second wavelength is focused upon the exit slit by angular rotation of the refracting element. If the second analysis is to be made by means of radiation of two wavelengths, the first of which has been used before and traveled along a normal optical path to the detector, the second of the wavelengths may be employed merely by altering the angular position of the refracting element. As only a single source and a single detector are used, errors are not introduced as a result, for example, of deterioration in the source or of a decrease in the sensitivity of the detector caused by aging.

The refracting element in the instruments described is a plane parallel plate, but it will be apparent that the faces of the element may be convergent to a greater or less extent, so that the element is wedge-shaped. With such a wedge-shaped element, the deviation of the refracted portion of the beam may be greater than that obtainable with a plane parallel plate of the same material and the wedge-shaped element may be placed anywhere between the entrance and exit slits or their equivalents.

In the instrument illustrated, the refracting element acts upon half the beam but the element is adjustable transversely of the beam and, by properly positioning it to lie within a greater or less portion of the beam, the relative intensities of the refracted and unrefracted portions of the beam may be varied, as desired. The relative intensities of the two portions of the beam may also be varied by the use of obstructing or filtering means inserted in one or both portions of the beam.

In the instruments illustrated, a refracting element is employed as the means for deviating a portion of the radiation passing to the detector but, if desired, other means may be employed for the purpose. The dispersion of the beam may be effected by the Littrow combination of a prism and a plane mirror, which receives the dispersed radiation from the prism and returns it to the prism for a second dispersion. By forming the mirror in two parts extending parallel to the plane of dispersion and adjustable about an axis normal to that plane, the two parts of the mirror may be set in different angular positions. If the radiation reflected from one part of the mirror is regarded as traveling along the normal path, the radiation reflected from the other part of the mirror will be deviated with respect to the normal path and, by proper angular adjustment of the two parts of the mirror, radiation of the two wavelengths desired will fall upon the exit slit.

All forms of the new apparatus include a monochromator comprising an entrance slit or its equivalent, collimating means, dispersing means, focusing means, and an exit slit or its equivalent. The monochromator has incorporated in it means for deviating a portion only of the radiation traveling from the entrance slit to the exit slit, so that part of the radiation travels along a normal optical path and the remainder is deviated from that path. As a result of a part only of the radiation being deviated, the radiation, which falls upon the exit slit, is monochromatic radiation of two kinds differing in wavelength. Depending upon the position of the chopping means, the radiation issuing through the exit slit is either a mixture of the two kinds of radiation, or else the radiation of the two kinds issues through the slit in alternation. The action of the chopping means causes the monochromatic radiation of the two wavelengths to fall alternately upon the detector and the signals representing the response of the detector to the two kinds of radiation may thus be separated and used in any desired manner.

The term "wavelength" as used in the foregoing specification and appended claims is, of course, intended to refer not to a single wavelength but to a narrow band of wavelengths. Ordinarily, the two bands used in the instrument are each made up of consecutive wavelengths, but, if desired, the deviated portion of the beam may be made up of two or more bands, which are non-adjacent in the spectrum. For the latter purpose, a plurality of independently adjustable deviating means are employed.

I claim:

1. In an apparatus for segregating from divergent radiation from a source monochromatic beams differing in wavelength, the combination of a single uninterrupted entrance slit, means for collimating a beam of radiation passing from the source through the entrance slit, means for dispersing the collimated beam, means for focusing the dispersed beam, a single exit slit, a single detector responsive to the radiation and upon which the focused radiation issuing through the exit slit falls, means between the source and detector and separate from the dispersing means for deviating a portion only of the beam traveling to the detector, and radiation chopping means disposed at an effective position relative to the deviating means to cause the deviated and undeviated portions of the beam falling upon the detector to be periodically interrupted at a phase difference.

2. In an apparatus for segregating from divergent radiation from a source monochromatic beams differing in wavelength, the combination of a single uninterrupted entrance slit, means for collimating a beam of radiation passing from the source through the entrance slit, means for dispersing the collimated beam, a single exit slit, means for focusing the dispersed beam upon the exit slit, a single detector responsive to the radiation disposed beyond the exit slit and upon which the focused radiation falls, means between the source and the exit slit and separate from the dispersing means for deviating a portion only of the beam traveling to the detector, and radiation chopping means disposed at an effective position relative to the deviating means to cause the deviated and undeviated portions of the beam falling upon the detector to be periodically interrupted at a phase difference.

3. In an apparatus for producing monochromatic beams of radiation differing in wavelengths, the combination of a source of divergent radiation including radiation of at least two wavelengths, an entrance slit for admitting a beam of radiation from the source, means for collimating said beam, means for dispersing the collimated beam, a single exit slit, means for focusing the dispersed beam upon the exit slit, a single detector responsive to the radiation disposed beyond the exit slit and upon which the focused radiation falls, means between the entrance and exit slits and separate from the dispersing means for deviating a portion only of the beam traveling to the detector, and radiation chopping means disposed at an effective position relative to the deviating means to cause the deviated and undeviated portions of the beam falling upon the detector to be periodically interrupted at a phase difference.

4. In an apparatus for producing monochromatic beams of radiation differing in wavelength from a source of divergent radiation including radiation of at least two wavelengths, the combination of a single uninterrupted entrance slit, means for collimating a beam of radiation from the source passing through the entrance slit, means for dispersing the collimated beam, means for focusing the dispersed beam, a single detector responsive to the radiation and upon which the focused radiation falls, a plate of material transparent to the radiation mounted to lie in the path of a portion only of the radiation on its way from the source to the detector, the plate acting to refract and deviate the radiation passing through it, and radiation chopping means disposed at an effective position relative to said plate to cause the deviated and undeviated portions of the beam falling upon the detector to be periodically interrupted at a phase difference.

5. In an apparatus for producing monochromatic beams of radiation differing in wavelength, the combination of a source of divergent radiation including radiation of at least two wavelengths, a single uninterrupted entrance slit, means for collimating a beam of radiation from the source passing through the entrance slit, means for dispersing the collimated beam, means for focusing the dispersed beam, a single detector responsive to the radiation and upon which the focused radiation falls, means between the source and detector for deviating a portion only of the beam traveling to the detector, and radiation chopping means disposed close to the deviating means and at an effective position to cause the deviated and undeviated portions of the beam falling upon the detector to be periodically interrupted at a phase difference.

6. In an apparatus for producing monochromatic beams of radiation differing in wavelength, the combination of a source of divergent radiation including radiation of at least two wavelengths, a single uninterrupted entrance slit, means for collimating a beam of radiation from the source passing through the entrance slit, means for dispersing the collimated beam, a single exit slit, means for focusing the dispersed beam, a single detector responsive to the radiation and upon which the focused radiation falls, means between the source and detector for deviating a portion only of the beam traveling to the detector, and radiation chopping means disposed substantially at the location of an image of said deviating means to cause the deviated and undeviated portions of the beam falling upon the detector to be periodically interrupted at a phase difference.

7. In an apparatus for producing monochromatic beams of radiation differing in wavelength from a source of divergent radiation including radiation of at least two wavelengths, the combination of a single uninterrupted entrance slit, means for collimating a beam of radiation from the source passing through the entrance slit, means for dispersing the collimated beam, a single exit slit, means for focusing the dispersed beam upon the exit slit, a single detector responsive to the radiation disposed beyond the exit slit and upon which the focused radiation falls, means between the focusing means and the exit slit and separate from the dispersing means for deviating a portion only of the beam on its way to the exit slit, and radiation chopping means disposed in an effective position relative to the deviating means to cause the deviated and undeviated portions of the beam falling upon the detector to be periodically interrupted at a phase difference.

8. In an apparatus for producing monochromatic beams of radiation differing in wavelength from a source of divergent radiation including radiation of at least two wavelengths, the combination of a single uninterrupted entrance slit for admitting a beam of radiation from the source, means for collimating said beam, means for dispersing the collimated beam, means for focusing the dispersed beam, a single exit slit, upon which the focused beam falls, means between the entrance slit and the collimating means and separate from the dispersing means for deviating a portion only of the beam, a single detector responsive to the radiation disposed beyond the exit slit in a position to receive mixed deviated and undeviated radiation through the exit slit, and radiation chopping means disposed in an effective position relative to the deviating means to cause the deviated and undeviated portions of the beam falling upon the detector to be periodically interrupted at a phase difference.

9. In an apparatus for segregating from radiation from a source monochromatic beams differing in wavelength, the combination of a monochromator receiving radiation from the source and including a single entrance slit, dispersing means, and a single exit slit, means within the monochromator and independent of and spaced from the dispersing means for deviating from its normal optical path part only of the radiation traveling through the monochromator, a single detector receiving radiation issuing through the exit slit, and radiation chopping means disposed at an effective position relative to the deviating means to cause the deviated and undeviated portions of the radiation to fall upon the detector with a phase difference.

References Cited in the file of this patent

UNITED STATES PATENTS

| Number | Name | Date |
|---|---|---|
| 1,919,182 | Gerald | July 18, 1933 |
| 2,078,768 | Meier | Apr. 27, 1937 |
| 2,166,824 | Runaldue | July 18, 1939 |
| 2,439,373 | Stearns | Apr. 6, 1948 |
| 2,462,946 | Coggeshall et al. | Mar. 1, 1949 |

FOREIGN PATENTS

| Number | Country | Date |
|---|---|---|
| 10,200 | Great Britain | of 1911 |
| 664,233 | Germany | Aug. 24, 1938 |
| 685,815 | Germany | Dec. 27, 1939 |